Patented Oct. 4, 1932

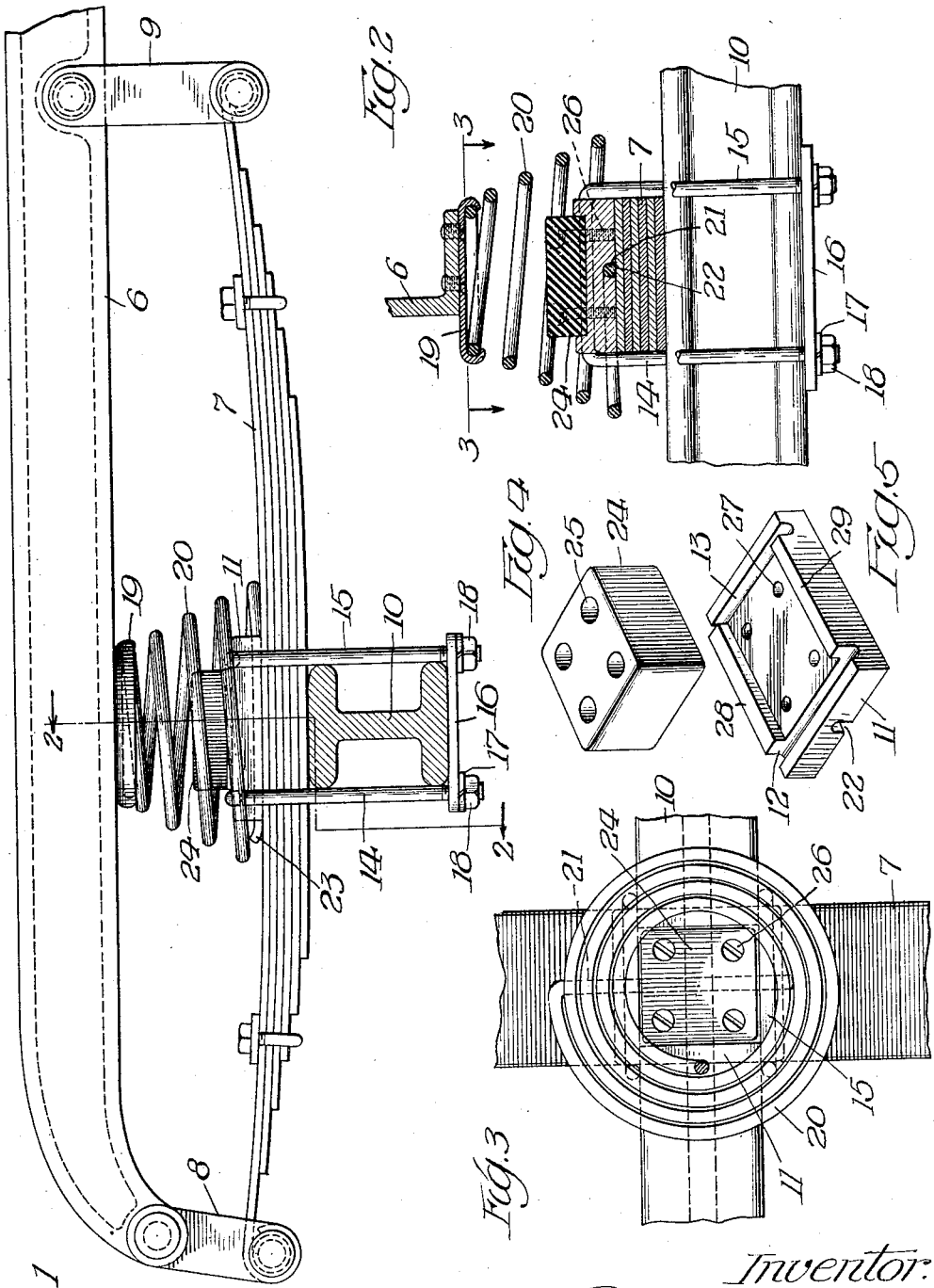

1,881,277

UNITED STATES PATENT OFFICE

ROBERT JACKSON, OF CHICAGO, ILLINOIS

SPRING DEVICE

Application filed July 25, 1931. Serial No. 553,034.

This invention relates to spring devices for automotive vehicles or the like and the primary object of the invention is to provide a novel arrangement for absorbing shocks to thereby improve the riding qualities of the vehicle.

Further objects are to dissipate shocks incidental to the engagement of the spring devices or the like with the frame of the vehicle; to provide a novel mounting for the spring and shock absorbing devices; and to provide a spring device of simple and economical construction and efficient and positive operation.

In the selected embodiment of the invention illustrated in the accompanying drawing Fig. 1 is a fragmentary side elevation of a spring construction embodying the invention;

Fig. 2 is a sectional view taken substantially on the line 2—2 of Fig. 1;

Fig. 3 is a sectional view taken substantially on the line 3—3 of Fig. 2;

Fig. 4 is a perspective detail of a shock absorbing pad employed in the device; and Fig. 5 is a perspective detail view of a clamp block used in the device.

In the selected embodiment of the invention illustrated in the accompanying drawing, 6 indicates the frame of the vehicle and 7 a flat leaf spring of the usual construction having the ends thereof connected to the frame 6 by the shackles 8 and 9. The axle 10 is arranged below the medial portion of the spring 7 and a clamp block 11 is rested on the upper surface of the spring and has transverse grooves 12 and 13 therein in which the bights of the U-bolts 14 and 15 are disposed. A plate 16 is arranged below the axle 10 and has openings therein through which the limbs of the U-bolts 14 and 15 may be passed and lock washers 17 and nuts 18 are mounted on the limbs of the U-bolts below the plate 16 whereby the nuts may be tightened to urge the plate 16 toward the axle and the block 11 toward the spring to effectively clamp the spring on the axle.

On the frame 6 in alinement with the axle 10 a cup 19 is secured and the smallest convolution of a spiral helical spring 20 is secured in this cup. The convolutions of the spring 20 are so disposed relative to each other that the spring may be flattened and when it is flattened, each convolution will lie within the adjacent outward convolution, this arrangement permitting the spring to be disposed in a flat plane. The lowermost convolution of the spring terminates in a limb 21 extending diametrically across the greatest diameter of the spring and a groove 22 is provided in the lower face of the block 11 in which the limb 21 may be disposed to be clamped in position. The free end of the limb is upturned as indicated at 23 to prevent displacement of the limb from the groove. Since the upper end of the spring 20 is fixed in the cup 19 and as the lower end thereof is securely fast as just described, it is manifest that the spring is effectively retained in position. Preferably the spring 20 is of such extent that normally it will extend halfway between the spring 7 and the frame 6 and therefore when the spring is elongated to be connected to the cup 19 and below the block 6, it is under tension and when the spring is flattened, it is again placed under tension. Because of this arrangement, the spring serves to absorb shocks resulting from quick movement of the axle 10 upwardly which compresses the spring 7 and the spring 20 serves to dissipate the shock so that a gradual uniform action will result rather than a quick movement. Shocks imparted to the axle 10 may be of sufficient force to sufficiently flex the spring 7 that the medial portion thereof will engage the frame 6. The force of an impact resulting from such engagement may be dissipated by providing a pad of rubber or other resilient material in the position whereat the engagement is most likely to occur, which is the medial portion of the spring 7. Such a pad is indicated by 24 of the drawing and has openings 25 therein which are countersunk, as illustrated in Fig. 2, so that the heads of screws 26 may be disposed below the upper surface of the pad 24. These screws pass into tapped openings 27 in the block 11 and in this manner the pad 24 is effectively secured in position. To aid in the retention of the pad 24 in the event of impact thereof with the frame 6 or parts thereon, ribs 28 and 29 are provided on the side edges of the block 11 and these ribs extend between the grooves 12 and 13 and engage the side edges of the pad 24. The end edges of the pad engage the bights of the U-bolts 14 and 15 as these U-bolts are so disposed in the grooves 12 and 13 that they project slightly above the upper surface of the block 11.

It is manifest from the foregoing description that I have provided a spring arrangement for automotive vehicles or the like which will effectively absorb shocks imparted to the axle of the vehicle so as to improve the riding qualities of the vehicle. Furthermore, a shock dissipating arrangement is provided to dissipate any shock incidental to the engagement of the spring devices with the frame of the vehicle and this shock dissipating member is effectively retained in position in a manner which will permit replacement thereof when necessary.

While I have illustrated and described a selected embodiment of my invention, it is to be understood that this is capable of variation and modification and I therefore do not wish to be limited to the precise details set forth but desire to avail myself of such changes and alterations as fall within the purview of the following claims:

I claim:

1. In a spring construction for use with the frame of an automotive vehicle or the like including an axle, a flat leaf spring having the ends thereof connected to said frame, a spiral helical spring having the smaller end thereof connected to the frame and having a limb at the larger end thereof extending diametrically across the greatest diameter thereof, a clamp block having a groove in one face thereof and arranged on said flat leaf spring with said limb disposed in said groove, and means acting on said clamp block for attaching the spring to the axle of the vehicle.

2. In a spring construction for use with the frame of an automotive vehicle or the like including an axle, a flat leaf spring having the ends thereof connected to said frame, a spiral helical spring, means connecting the smaller end of said spring to said frame, said spring having a limb in the larger end thereof extending diametrically across the greater diameter thereof, a clamping block having a groove in one face thereof and arranged on said flat leaf spring with said limb disposed in said groove, a plate below the axle of the vehicle in alinement with said spring and said clamp block, and means interconnecting said plate and said clamp block to secure said spring to said axle.

3. In a spring construction for use with the frame of an automotive vehicle or the like including an axle, a flat leaf spring having the ends thereof connected to said frame, a spiral helical spring having the smaller end thereof connected to the frame and having a limb at the larger end thereof extending diametrically across the greatest diameter thereof, a clamp block having a groove in one face thereof and arranged on said flat leaf spring with said limb disposed in said groove, means acting on said clamp block for attaching the spring to the axle of the vehicle, and shock absorbing means on said clamp block inwardly of said spiral helical spring.

4. In a spring construction for use with the frame of an automotive vehicle or the like including an axle, a flat leaf spring having the ends thereof connected to said frame, a spiral helical spring having the smaller end thereof connected to the frame, a clamp block connecting the larger end of said spiral helical spring to said flat leaf spring, ribs on said block and extending above one face thereof, U-bolts having the bights thereof extending across said clamp block and past said ribs, the bights of said U-bolts also extending above the face of said block, the free ends of said U-bolts having means engaged therewith to connect said flat leaf spring to the axle, a resilient shock absorbing pad on said clamp block between the bights of said U-bolts and said ribs, said pad having countersunk openings therein, and screws extended through said countersunk openings and connected to said block to retain said pad on said block, said screws having the heads thereof disposed below the upper surface of said pad so as not to interfere with the functioning thereof in event of impact of the frame with said pad.

5. In a spring construction for use with the frame of an automotive vehicle or the like including an axle, a flat leaf spring having the ends thereof connected to said frame, a spiral helical spring having the smaller end thereof connected to the frame, a clamp block connecting the larger end of said spiral helical spring to said flat leaf spring, said block having transverse grooves therein, U-bolts having the bights thereof disposed in said grooves and depending past said flat leaf spring and having means at the free ends thereof for connecting said flat leaf spring to said axle, a resilient shock absorbing pad on said block between said U-bolts, ribs on said block extending between said grooves and engaging said pad to prevent displacement thereof, and means for securing said pad on said block.

ROBERT JACKSON.